US006813575B2

(12) United States Patent
Laflamme

(10) Patent No.: US 6,813,575 B2
(45) Date of Patent: Nov. 2, 2004

(54) PORTABLE COMPUTER CONTROL FOR COOKING APPLIANCES AND METHOD OF USING

(75) Inventor: Benoit Laflamme, Quebec (CA)

(73) Assignee: Quebec, Inc., Quebec (CA)

( * ) Notice: Subject to any disclaimer, the term of this patent is extended or adjusted under 35 U.S.C. 154(b) by 0 days.

(21) Appl. No.: 09/943,849

(22) Filed: Aug. 31, 2001

(65) Prior Publication Data

US 2003/0041745 A1 Mar. 6, 2003

(51) Int. Cl.[7] .......................... G01K 15/00; A47J 27/00

(52) U.S. Cl. ......................... 702/99; 702/116; 702/130; 99/324; 99/325; 99/326; 99/329; 99/342

(58) Field of Search .......................... 702/99, 116, 130; 371/1, 100; 99/324, 325, 326, 329, 342

(56) References Cited

U.S. PATENT DOCUMENTS 4,761,539 A * 8/1988 Carmean .................... 219/497
5,844,209 A * 12/1998 Gunther ...................... 219/506
6,137,095 A * 10/2000 Kashimoto et al. ......... 219/702
6,362,458 B1 * 3/2002 Sargunam et al. .......... 219/396
6,466,951 B1 * 10/2002 Birkler et al. .............. 707/201
2002/0143551 A1 * 10/2002 Sharma et al. ........... 704/270.1

* cited by examiner

*Primary Examiner*—John Barlow
*Assistant Examiner*—Meagan S Walling
(74) *Attorney, Agent, or Firm*—John R. Ross; John R. Ross, III

(57) ABSTRACT

A cooking system having a cooking appliance and a remote computer. The cooking appliance has a programmable control module that controls a heating device. The heating device is in communication with and provides heat to a cooking location. The programmable control module is in communication with the remote computer unit via a wireless communication link. In a preferred embodiment, the remote computer unit is a Palm Pilot and the wireless communication link is an infrared (IR) link. Also, in the preferred embodiment, a temperature acquisition module is in communication with the Palm Pilot via a serial link. A temperature probe is connected to the temperature acquisition module. The temperature probe is in communication with the cooking location and senses the temperature of the cooking location. The sensed temperature is transmitted via the temperature acquisition module to the Palm Pilot. In a preferred embodiment, the Palm Pilot is used to transmit calibration instructions to the programmable control module.

26 Claims, 2 Drawing Sheets

PORTABLE COMPUTER CONTROL FOR COOKING APPLIANCES AND METHOD OF USING

The present invention relates to cooking appliances, and in particular to devices for controlling cooking appliances.

BACKGROUND OF THE INVENTION

Programmable electronic control modules are commonly used in cooking appliances (such as ovens, fryers, warmers, and coffee brewers) commonly found in restaurants. Restaurant operators need control modules that are easy to use and program. These modules should produce consistent food quality, regardless of the operator's experience.

Currently, control modules typically are operated and programmed at the small keypad on control modules located on the actual cooking appliance. Tasks such as setting a preprogram key for the cook time, cook temperature and other preprogrammed parameters are presently done manually by the operator. For a restaurant with multiple cooking appliances, this means that an operator manually programs each cooking appliance individually. This is a tremendous waste of time where a restaurant has several cooking appliances, each requiring identical programming. For the typical restaurant, operational statistics of a cooking appliance, if recorded at all, is done manually by an operator who reads the statistics off the control module's display and then records the statistics with a pen onto a notepad.

Also, cooking appliance calibration adjustments are currently entered manually at the keypad of the cooking appliance's control module. Likewise, food temperature verification adjustments are also entered manually at the keypad of the cooking appliance's control module. For example, after cooking hamburger patties the temperature of the meat is measured. If the temperature of the meat is too low or too high, the cook time has to be readjusted manually on the keypad of the control module. All these measurements and data values are logged by hand and kept on file for further verification. These manipulations are time consuming and the operator can easily make mistakes, either in the manual manipulation of the control module's keypad or in the manual recording of data.

What is needed is a better interface for control of a cooking appliance.

SUMMARY OF THE INVENTION

The present invention provides a cooking system having a cooking appliance and a remote computer. The cooking appliance has a programmable control module that controls a heating device. The heating device is in communication with and provides heat to a cooking location. The programmable control module is in communication with the remote computer unit via a wireless communication link. In a preferred embodiment, the remote computer unit is a Palm Pilot and the wireless communication link is an infrared (IR) link. Also, in the preferred embodiment, a temperature acquisition module is in communication with the Palm Pilot via a serial link. A temperature probe is connected to the temperature acquisition module. The temperature probe is in communication with the cooking location and senses the temperature of the cooking location. The sensed temperature is transmitted via the temperature acquisition module to the Palm Pilot. In a preferred embodiment, the Palm Pilot is used to transmit calibration instructions to the programmable control module.

DETAILED DESCRIPTION OF THE PREFERRED EMBODIMENTS

Preferred embodiments of the present invention are hereinafter described by reference to the drawings.

Figure 1:
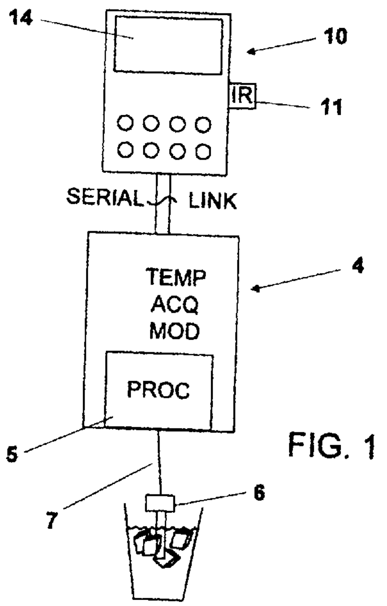
FIG. 1 shows a preferred embodiment of the present invention with the temperature probe inserted into ice water.

As shown in FIG. 1, small portable computer 10 comprises an infrared (IR) transceiver 11. A preferred computer 10 is a Palm Pilot, which is a portable computer that is usually smaller in size and less expensive than a normal laptop computer. A Palm Pilot is also referred to as a Personal Digital Assistant (PDA). Computer 10 is connected via a serial link to portable temperature acquisition module 4. In the preferred embodiment, computer 10 and temperature acquisition module 4 are hand portable, weighing approximately 8 ounces. Temperature acquisition module 4 has processor 5. Temperature probe 6 is connected to processor 5 via wire 7. In the preferred embodiment, temperature acquisition module 4 is manufactured by Tangent Systems, Inc., part no. MT-20S, with offices in Charlotte, N.C.

Verify Temperature Acquisition Module and Temperature Probe

As shown in FIG. 1, the accuracy of temperature acquisition module 4 and temperature probe 6 are first verified by inserting temperature probe 6 into a glass of ice water. A glass of ice water is 32 degrees F. Processor 5 will transmit the temperature sensed by temperature probe 6 via the serial link to computer 10 where the value of the temperature will be displayed on screen 14. If the temperature reading is 32 degrees F. at computer 10, then the operator has verified temperature acquisition module 4 and temperature probe 6. If, however, the temperature reading is anything other than 32 degrees F. at computer 10, the operator should replace probe 6 and try again. If, the temperature reading is still not equal to 32 degrees F. at computer 10, the operator should then check and verify computer 10 and temperature acquisition module 4 as appropriate.

Calibrating the Cooking Appliance

Figure 2:
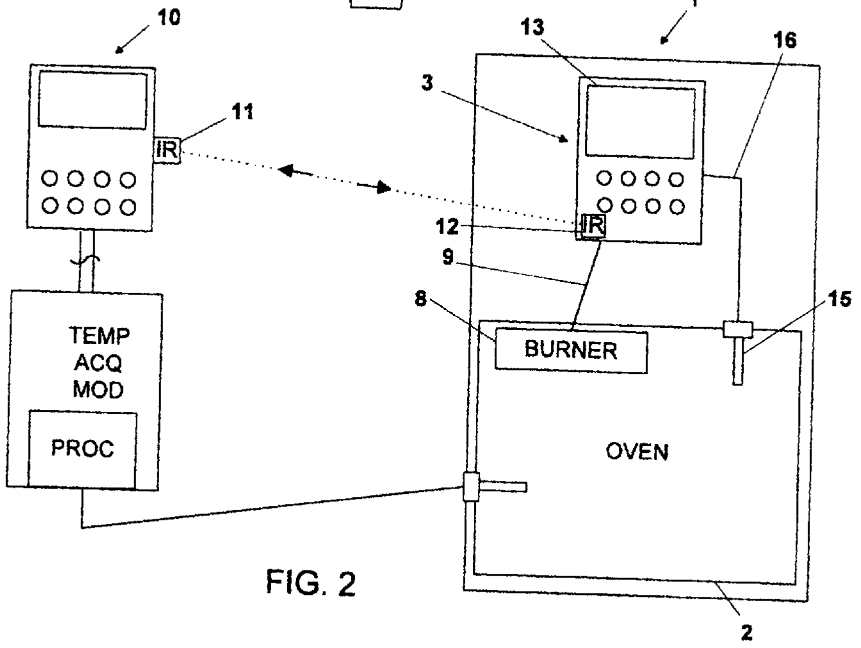
FIG. 2 shows the preferred embodiment of FIG. 1 in communication with a cooking appliance.

After having verified temperature acquisition module 4 and temperature probe 6, the operator is able to use temperature acquisition module 4 and temperature probe 6 to calibrate an appliance. FIG. 2 shows cooking appliance 1 having oven 2 and control module 3. Burner 8 is connected to control module 3 via wire 9 and temperature sensor 15 is connected to control module 3 via wire 16. Control module 3 has display screen 13 and IR transceiver 12.

In the preferred embodiment, the operator first selects the appliance he is calibrating at computer 10. The operator then inserts temperature probe 6 into cooking appliance 1 so that it is able to sense the temperature inside oven 2. The operator then establishes an IR link between IR transceiver 11 of computer 10 and IR transceiver 12 of control module 3. The operator then sets the temperature to which oven 2 will be heated at computer 10. For example, in one preferred embodiment, the operator may establish as a set temperature 350 degrees F. By pressing a key on computer 10 an IR signal is sent to control module 3 to start burner 8. Temperature sensor 15 of cooking appliance 1 sends a signal to control module 3 correlating to the temperature of oven 2. As the temperature of oven 2 begins to approach 350 degrees F., control module 3 is programmed to begin to make adjustments to burner 8 so that a temperature of 350 degrees F. will be maintained in oven 2.

In the preferred embodiment, after temperature acquisition module 4 has sensed that the temperature inside oven 2 has remained stable for a predetermined period of time (i.e., preferably approximately 5 minutes) computer 10 will compare the temperature sensed by temperature probe 6 with the set point temperature. If the result of the comparison is within an acceptable margin of error, the calibration process is complete. If however, there is a significant discrepancy between the set point temperature and the temperature sensed by temperature probe 6, control module 3 needs to be reprogrammed to compensate for the discrepancy. For example if the set point temperature is 350 degrees F., but the temperature sensed by probe 6 is 340 degrees F., there is a significant discrepancy and control module 3 needs to be reprogrammed.

In the preferred embodiment, control module 3 is reprogrammed by downloading programming instructions from computer 10 to control module 3 via the IR link. The programming instructions downloaded from computer 10 are to program control module 3 to compensate for the discrepancies noted during the calibration process.

Food Temperature Verification

The present invention can also be used for food temperature verification. It is very important that food is properly cooked to a safe temperature. For example, the USDA has recommended that in order to kill the dangerous form of *E. coli* bacteria known as O157:H7 that ground beef be cooked until it reaches 160 degrees F.

Figure 3:
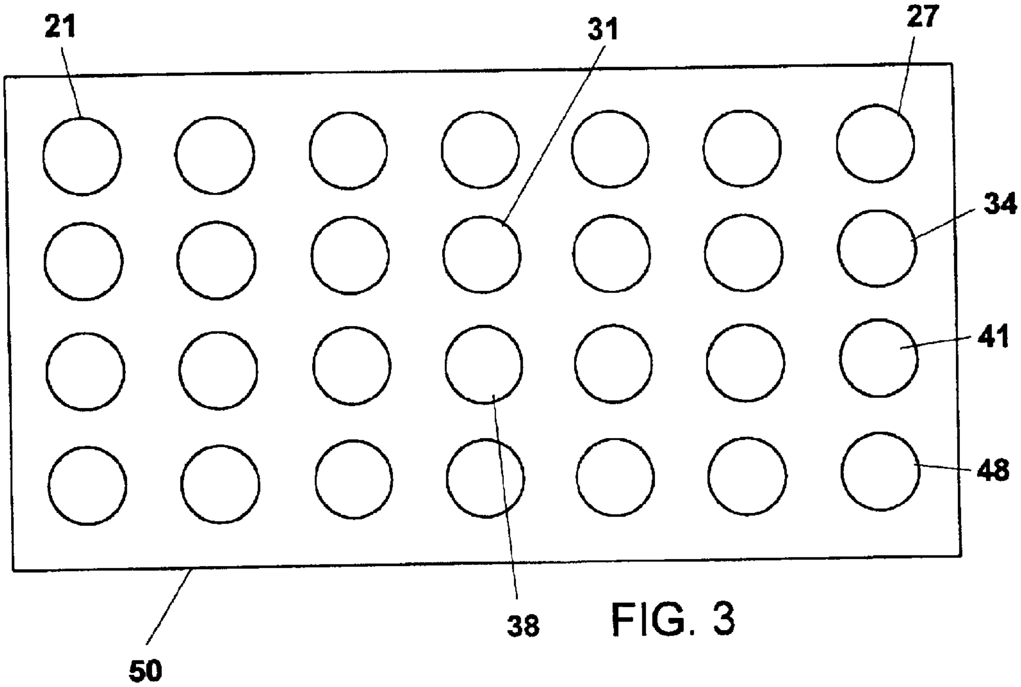
FIG. 3 shows a tray of hamburger patties.

In a preferred embodiment, the present invention may be used to verify that hamburger patties have been properly cooked. For example, FIG. 3 shows hamburger patties 21–48 positioned on tray 50. The operator will first cook the hamburger patties as usual utilizing a cooking appliance that is controlled by a control module (such as an oven, a broiler, or a grill). The operator will then remove the hamburger patties from the cooking appliance.

Figure 4:
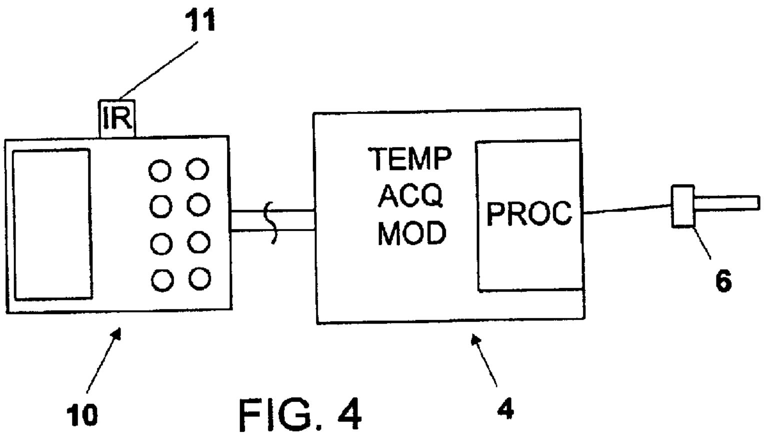
FIG. 4 shows a preferred embodiment of the present invention.

Prior to testing the temperature of a hamburger patty, the operator selects the food type and weight by pressing the appropriate keys on computer 10. Temperature probe 6 (FIG. 4) is then inserted into the hamburger patties to take their temperature to verify that they have been cooked to the appropriate temperature. The location of the temperature verification is preferably done in order to cover the worst case. For example, probe 6 will be inserted into the middle of a patty because it is cooler in the middle of the patty than it is on the patty's surface. Also, for patties 21–48, verification is preferably done on the patties susceptible being less cooked. For example, patties 48 and 21 are located on the outside edge of the tray and may have gotten less heat in the cooking appliance than a patty that was located more towards the middle, such as patty 31 or patty 38.

The reading for each patty is preferably recorded by computer 10. Computer 10 is programmed to validate each patty. For example, for hamburger patties computer 10 is programmed to validate that each patty has been cooked to 160 degrees F. If computer 10 reports that a temperature reading for a hamburger patty is too low, computer 10 will indicate that the timer or the temperature set point of the control module of the cooking appliance has to be adjusted. The operator can then point IR transceiver 11 of computer 10 at the IR transceiver of the cooking appliance's control module and download the programming instructions in a fashion similar to that described above. The operator can then repeat the food verification procedure until the results indicate that the food is being appropriately cooked.

Some Other Functionalities of the PDA Data Storage

Computer 10 has data storage capability that can be used later to print a report or a chart of readings obtained. Also, the data can be downloaded to other computers for analysis or data storage.

Preprogramming Cooking Appliances

In a preferred embodiment, preprogramming of multiple cooking appliances (for example, modem medium to large restaurants have multiple programmable cooking appliances) is done by pressing the appropriate keys on computer 10. Then, after the preprogramming has been completed, the information can be easily and quickly transmitted via IR links to the restaurant's programmable cooking appliances. This contrasts sharply with the current method of having to preprogram each cooking appliance individually by pressing keys on each appliance's key pad (see discussion in Background section).

While the above description contains many specifications, the reader should not construe these as limitations on the scope of the invention, but merely as exemplifications of preferred embodiments thereof. Those skilled in the art will envision many other possible variations are within its scope. For example, although it was disclosed that computer 10 can be used to interface with various types of cooking appliances such as (such as an oven, a broiler, or a grill), it can also be used to interface with a variety of other appliances. For example, it can interface it could be used to interface with fryers, warmers and coffee brewers. Also, although the above embodiments disclose computer 10 interfacing with the control module of the cooking appliance through IR communication link, it is possible to utilize other types of programmable portable computers besides a PDA. For example, a portable laptop computer could replace computer 10. The laptop computer would preferably interface with the control module via an IR link. Alternatively, it could be configured to interface with the control module via a wire link. Also, other types of wireless communication links are available besides IR. For example, a portable computer could be configured to communicate with the control module via an optical or RF link. Also, although the above embodiments disclosed the present invention being utilized with one temperature probe 6 connected to temperature acquisition module 4, it would be possible to connect a plurality of temperature probes 6 to temperature acquisition module 4. In this embodiment, multiple temperature readings could be made simultaneously. The multiple temperature readings could be made of one food specimen (for example, a large turkey or a single hamburger patty) or a plurality of food specimens (for example, several hamburger patties). For example, as shown in FIG. 3, if four temperature probes 6 were utilized, they could simultaneously each be inserted into hamburger patties 21, 27, 48, and 38 to relay temperature information back to temperature acquisition module 4. Accordingly the reader is requested to determine the scope of the invention by the appended claims and their legal equivalents, and not by the examples which have been given.

I claim:

1. A cooking system, comprising:

A) a cooking appliance, comprising:
  i) a programmable control module,
  ii) a heating device controlled by said programmable control module, and
  iii) a cooking location wherein said heating device is in communication with said cooking location to provide heat to said cooking location, B) a remote computer in information communication with said programmable control module via a communication link, C) a temperature acquisition module in communication with said remote computer via a second communication link, and D) a temperature probe connected to said temperature acquisition module and in communication with said cooking location, wherein said temperature probe senses the temperature of said cooking location and wherein said sensed temperature is transmitted via said temperature acquisition module to said remote computer.

2. The cooking system as in claim 1, wherein said remote computer is a PDA.

3. The cooking system as in claim 1, wherein said remote computer is a Palm Pilot.

4. The cooking system as in claim 1, wherein said communication link is an infrared link.

5. The cooking system as in claim 1, wherein said remote computer is a portable laptop computer.

6. The cooking system as in claim 1, wherein said remote computer communicates programming instructions to said programmable control module via said communication link, and wherein said remote computer receives data from said programmable control module via said communication link.

7. The cooking system as in claim 1, wherein said second communication link is a serial link.

8. The cooking system as in claim 1, wherein said cooking appliance is a warmer and said cooking location is a warming area.

9. The cooking system as in claim 1, wherein said cooking appliance is a grill.

10. The cooking system as in claim 1, wherein said cooking appliance is an oven.

11. The cooking system as in claim 1, wherein said communication link is a wireless communication link.

12. The cooking system as in claim 1, wherein said calibration instructions comprise food temperature verification data.

13. The cooking system as in claim 12, wherein said cooking appliance is calibrated based on said food temperature verification data.

14. The cooking system as in claim 1, wherein said remote computer further communicates programming instructions to said programmable control module via said communication link.

15. The cooking system as in claim 1, wherein said cooking appliance is calibrated based on said calibration instructions.

16. The cooking system as in claim 1, wherein said remote computer communicates calibration instructions to said programmable control module via said communication link.

17. A method for calibration of a cooking appliance, comprising the steps of:

A) programming a set temperature into said cooking appliance, wherein said cooking appliance comprises:
  i) a programmable control module,
  ii) a heating device controlled by said programmable control module,
  iii) a cooking location wherein said heating device is in communication with said cooking location to provide heat to said cooking location, B) placing a remote computer in communication with said programmable control module via a wireless communication link, wherein said remote computer comprises:
  i) a temperature acquisition module in communication with said remote computer via a second communication link, and
  ii) a temperature probe connected to said temperature acquisition module and in communication with said cooking location, C) heating said cooking location via said heating device until the temperature of said cooking location remains substantially stable for a predetermined period of time, D) sensing the temperature of said cooking location via said temperature probe, E) transmitting said sensed temperature via said temperature acquisition module to said remote computer via said second communication link, F) comparing at said remote computer said set point temperature to said sensed temperature, and G) transmitting from said remote computer to said programmable control module calibration instructions based on the results of said comparing of said set point temperature to said sensed temperature.

18. The method as in claim 17, wherein said wireless communication link is an infrared link and said remote computer is a PDA.

19. A method for verifying the temperature of cooked food, comprising the steps of:

A) inserting food into a cooking appliance, wherein said cooking appliance comprises:
  i) a programmable control module,
  ii) a heating device controlled by said programmable control module, and
  iii) a cooking location wherein said heating device is in communication with said cooking location to provide heat to said cooking location, B) heating said food via said cooking appliance, C) removing said food from said cooking appliance, D) sensing the temperature of said food via a remote computer, wherein said remote computer comprises,
  i) a temperature acquisition module in communication with said remote computer via a communication link, and
  ii) a temperature probe connected to said temperature acquisition module and in communication with said food,
 wherein a desired food temperature has been programmed into said remote computer, E) comparing at said remote computer said desired food temperature to said sensed temperature, and F) transmitting from said remote computer to said programmable control module via a wireless communication link calibration instructions based on the results of said comparing of said desired food temperature to said sensed temperature.

20. The method as in claim 19, wherein said wireless communication link is an infrared link and said remote computer is a PDA.

21. The method as in claim 19, wherein said temperature probe is a plurality of temperature probes.

22. The method as in claim 19, wherein said temperature probe is a plurality of temperature probes and said food is a plurality of food specimens.

23. A cooking system, comprising:

A) a cooking appliance, comprising:
  i) a programmable control module,
  ii) a heating device controlled by said programmable control module, and
  iii) a cooking location wherein said heating device is in communication with said cooking location to provide heat to said cooking location, B) a remote computer in information communication with said programmable control module via a communication link, C) a temperature acquisition module in communication with said remote computer via a second communication link, and D) a temperature probe connected to said temperature acquisition module and in communication with food that has been heated within said cooking location and then removed from said cooking location, wherein said temperature probe senses the temperature of said food and wherein said sensed temperature is transmitted via said temperature acquisition module to said remote computer.

24. The cooking system as in claim 23, wherein said temperature probe is a plurality of temperature probes.

25. The cooking system as in claim 23, wherein said temperature probe is a plurality of temperature probes and wherein said food is a plurality of food specimens.

26. The cooking system as in claim 23, wherein said remote computer communicates calibration instructions to said programmable control module via said communication link.

* * * * *